(12) United States Patent  (10) Patent No.: US 8,128,412 B2
Carda et al.  (45) Date of Patent: Mar. 6, 2012

(54) MODEL HUMAN EYE

(75) Inventors: Dan D. Carda, Tucson, AZ (US); Johan T. W. Van Dalen, Tucson, AZ (US)

(73) Assignee: Eye Care and Cure Pte. Ltd, Signapore ( * ) Notice: Subject to any disclaimer, the term of this patent is extended or adjusted under 35 U.S.C. 154(b) by 1161 days.

(21) Appl. No.: 11/770,653

(22) Filed: Jun. 28, 2007

(65) Prior Publication Data

US 2009/0004636 A1   Jan. 1, 2009

(51) Int. Cl.
*G09B 23/28* (2006.01)

(52) U.S. Cl. ........................................ 434/271
(58) Field of Classification Search ................... 434/271
See application file for complete search history.

(56) References Cited

U.S. PATENT DOCUMENTS

| | | | |
|---|---|---|---|
| 5,561,137 A | 10/1996 | Or et al. | |
| 5,893,719 A | 4/1999 | Radow | |
| 5,964,776 A | 10/1999 | Peyman | |
| 6,887,083 B2 | 5/2005 | Umeyama | |
| 6,923,654 B2 | 8/2005 | Johnson | |
| 6,942,695 B1 * | 9/2005 | Chapoy et al. | 623/6.5 |
| 7,066,598 B2 | 6/2006 | Niven | |
| 2004/0097166 A1 * | 5/2004 | Maddocks et al. | 446/392 |

OTHER PUBLICATIONS

Kolb et al., Gross Anatomy of the Eye, Jan. 20, 2005, pp. 2.*
Eeva-Liisa Martola and Jules Baum. Central and Peripheral Corneal Thickness, A Clinical Study. 1968. Archives of Ophthamology, 79(1):28-30.*
International Preliminary Report on Patentability dated Sep. 9, 2010.

* cited by examiner

*Primary Examiner* — Xuan Thai
*Assistant Examiner* — Jerry-Daryl Fletcher
(74) *Attorney, Agent, or Firm* — Dale F. Regelman; Quarles & Brady LLP

(57) ABSTRACT

A model human eye is disclosed. The model human eye comprises a extended hemispherical-shaped assembly comprising a center point, an open end defined by a first continuous distal end, a cornea portion symmetrically disposed around the center point, and a sclera portion disposed between the cornea portion and the first continuous distal end. The extended hemispherical-shaped assembly comprises an integral molding. The model human eye further comprises a lenticular bag disposed within the extended hemispherical-shaped assembly. The model human eye further comprises a base comprising a bottom and one or more walls attached to that bottom and extending outwardly therefrom, where the one or more walls comprise a second continuous distal end. The first continuous distal end is attached to the second continuous distal end to define an enclosed space. The lenticular bag separates the enclosed space into an anterior chamber and a posterior chamber.

9 Claims, 17 Drawing Sheets

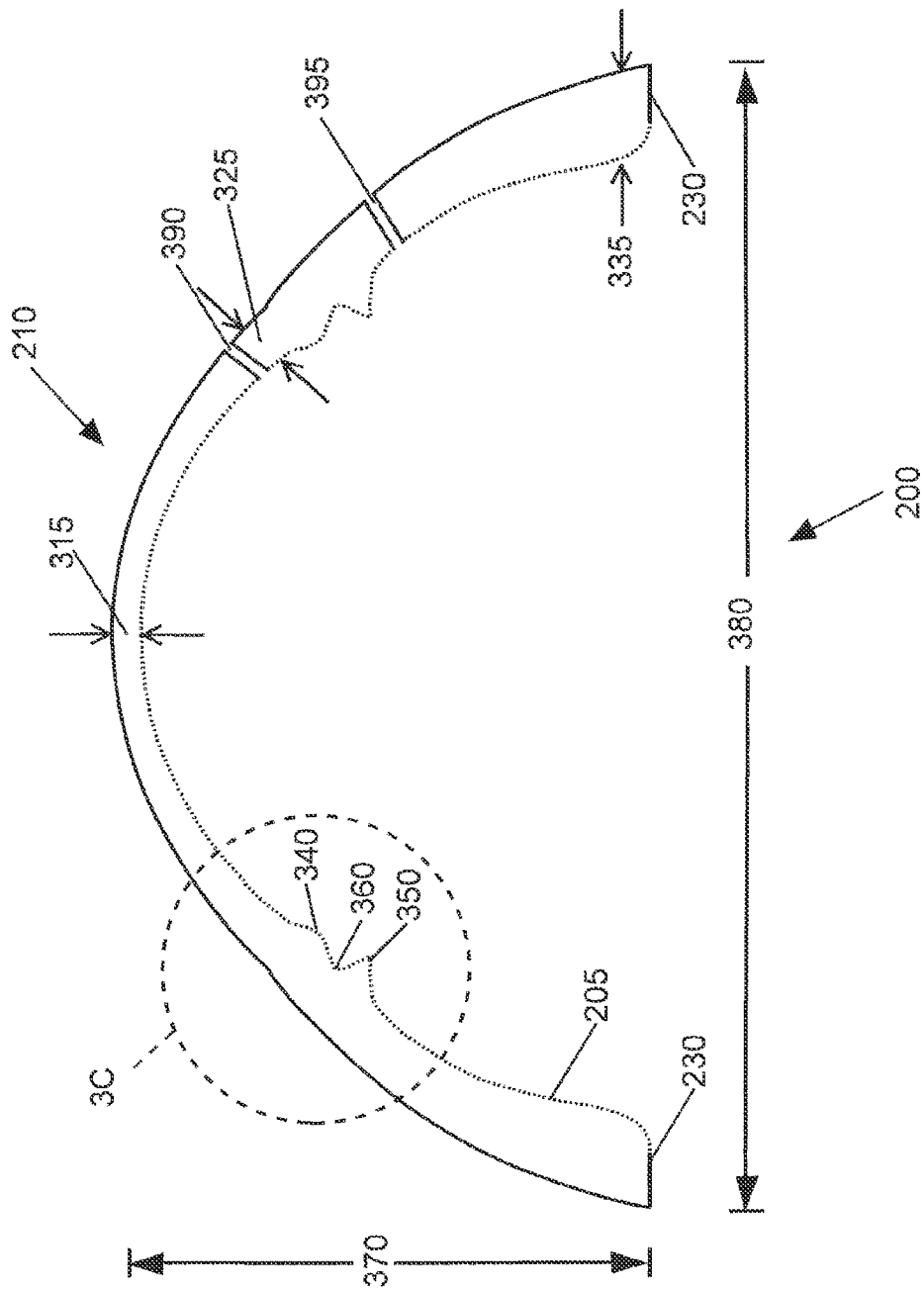

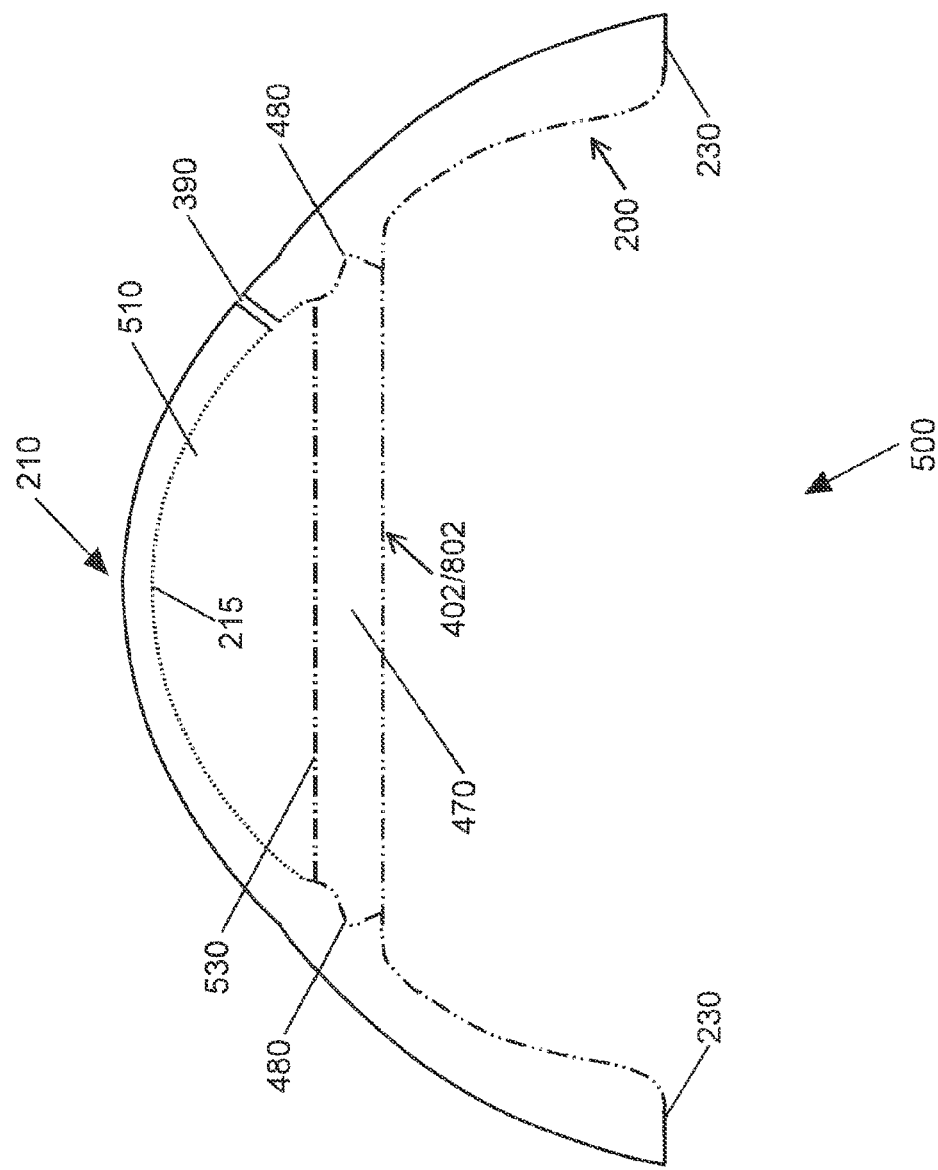

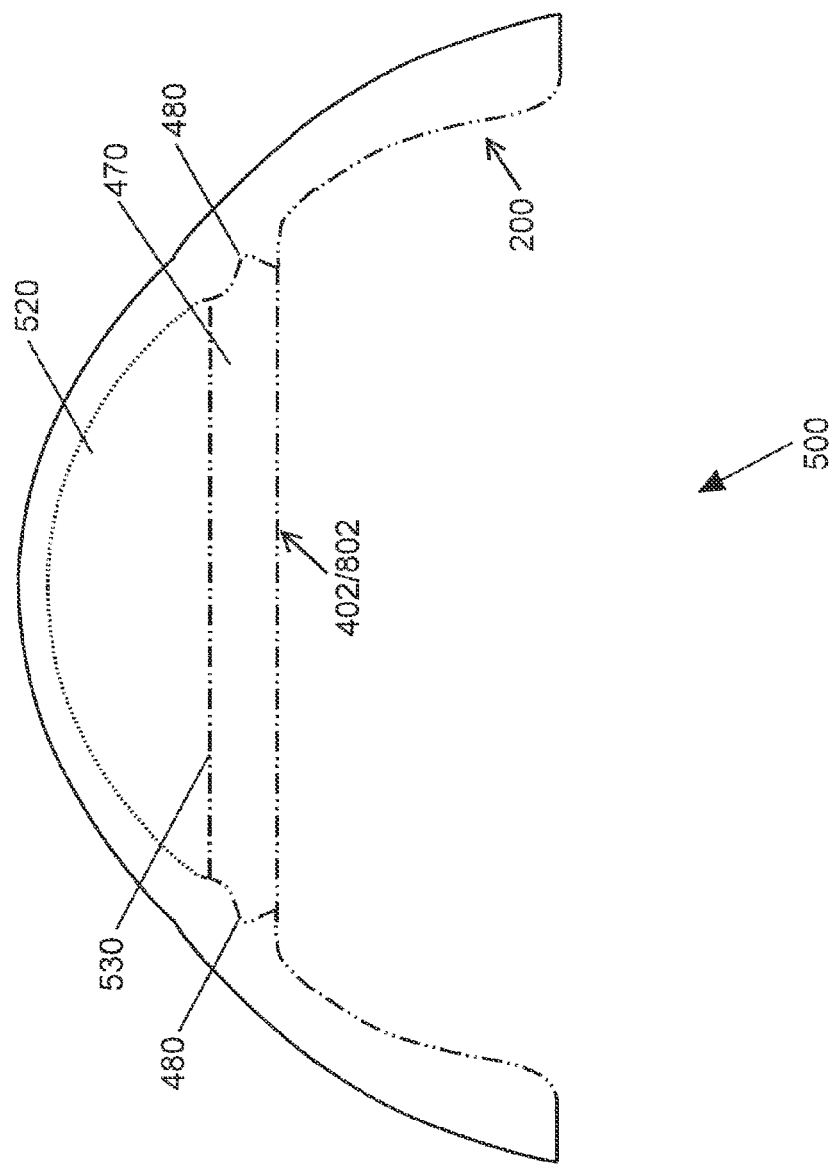

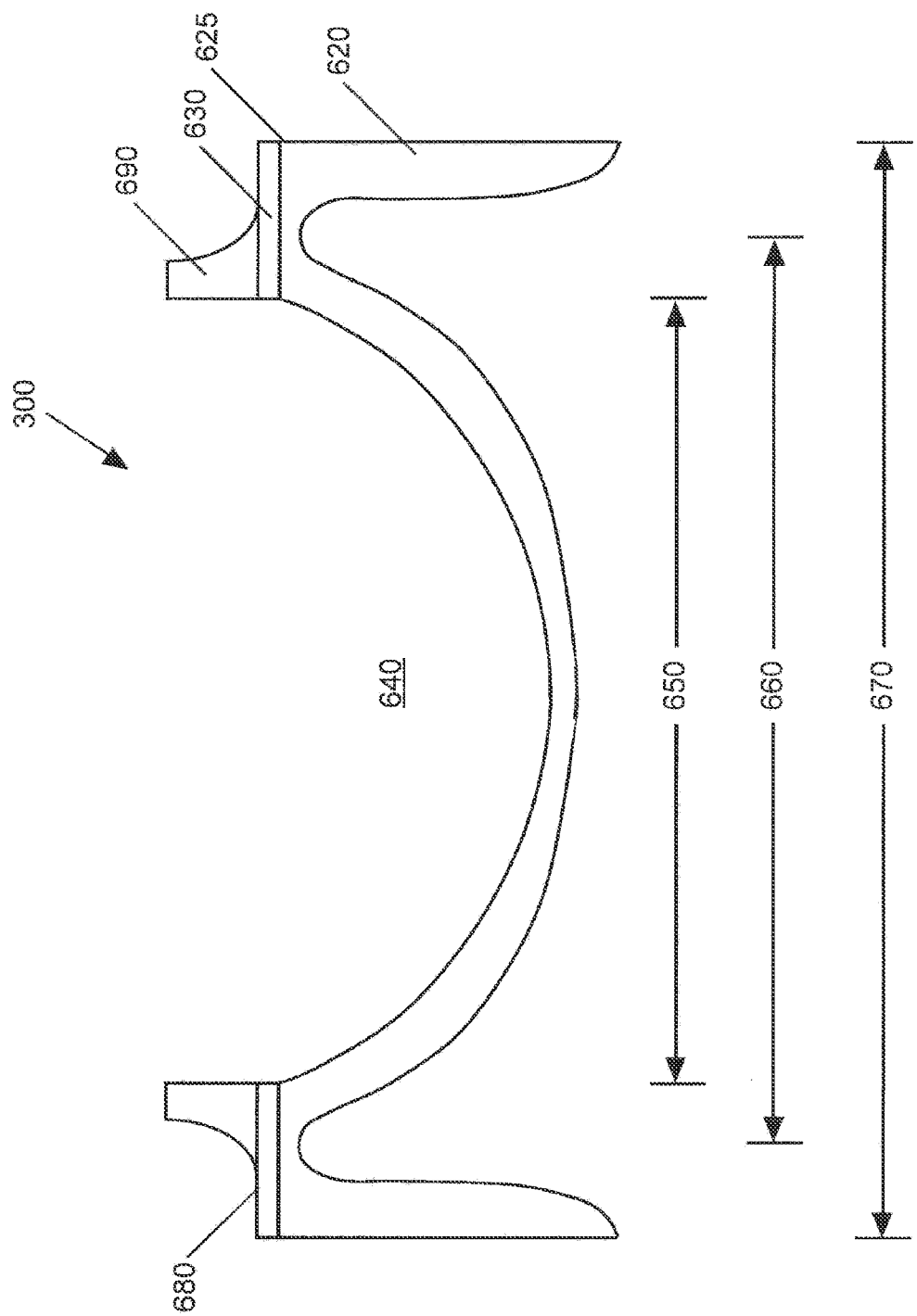

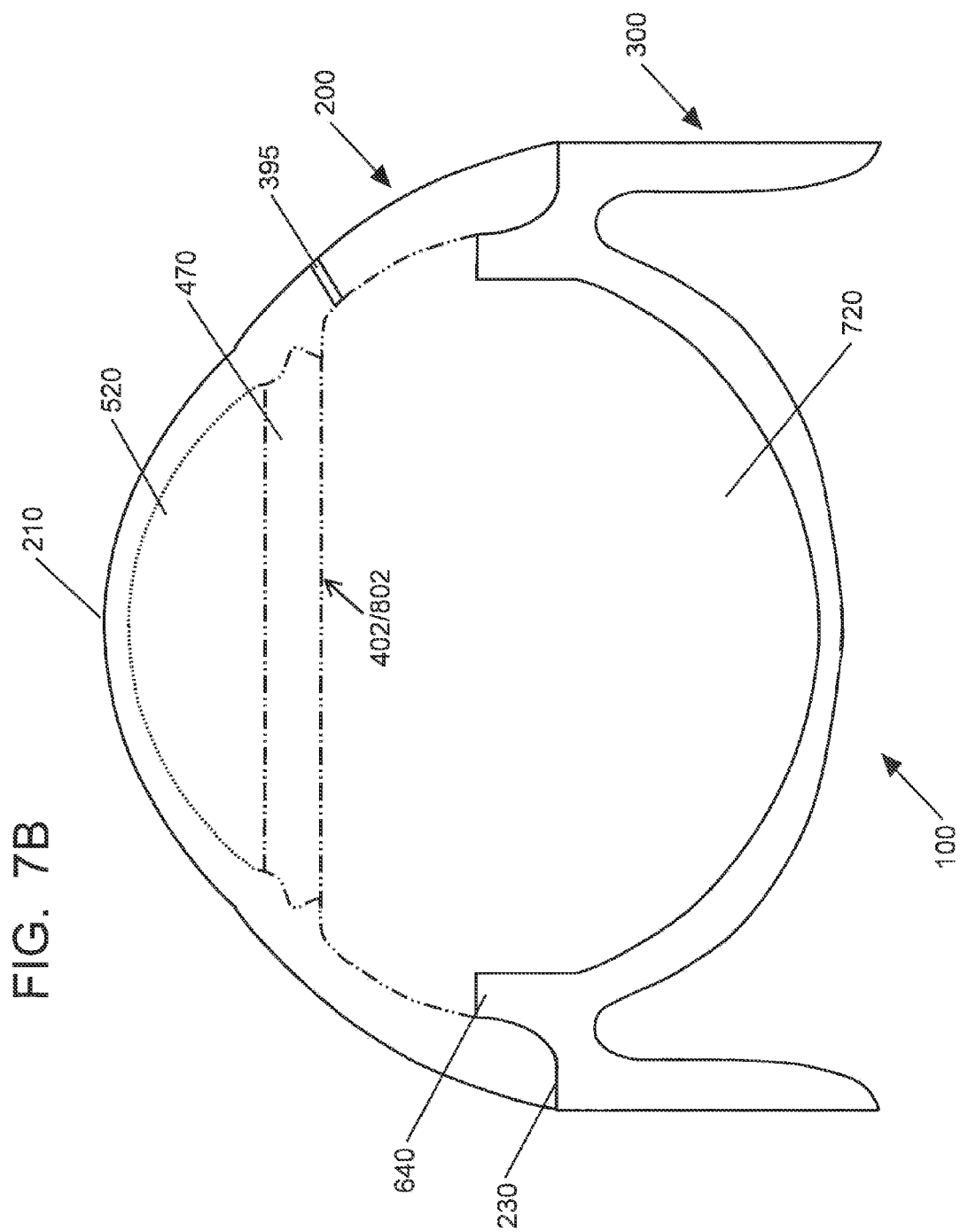

800

815

805

MODEL HUMAN EYE

FIELD OF THE INVENTION

This invention relates to a model human eye for pedagogical use by medical professionals.

BACKGROUND OF THE INVENTION

Medical students, interns, and residents, specializing in diagnosing and treating injuries to, and the diseases of, the eye must necessarily practice certain surgical techniques on various models of the human eye prior to actually operating on human patients. Prior art training methods often use animal eyes, such as, for example cow eyes.

The use of animal eyes is burdened with many procedural issues. The animal eyes must be refrigerated before use. The handling of such animal eyes requires compliance with, among other regulations, the Blood Born Pathogens Standard promulgated under the federal Occupational Health and Safety Act. After use, the animal eyes must be properly disposed of.

What is needed is a model human eye that closely mimics the anatomy and physiology of the human eye, but which does not require refrigeration and other special handling procedures. Applicants' invention comprises a model human eye that closely mimics the anatomy and physiology of the human eye.

SUMMARY OF THE INVENTION

The invention includes a model human eye. Applicants' model human eye comprises a extended hemispherical-shaped assembly comprising a center point, an open end defined by a first continuous distal end, a cornea portion symmetrically disposed around the center point, and a sclera portion disposed between the cornea portion and the first continuous distal end, where the assembly comprises an integral molding. The cornea portion is visually transparent, and the sclera portion is visually opaque.

Applicants' model human eye further comprises a lenticular bag disposed within the extended hemispherical-shaped assembly. The model human eye further comprises a base comprising a bottom and one or more walls attached to that bottom and extending outwardly therefrom, where the one or more walls comprise a second continuous distal end.

The first continuous distal end is attached to the second continuous distal end to define an enclosed space. The lenticular bag separates the enclosed space into an anterior chamber and a posterior chamber.

BRIEF DESCRIPTION OF THE DRAWINGS

The invention will be better understood from a reading of the following detailed description taken in conjunction with the drawings in which like reference designators are used to designate like elements, and in which:

FIG. 3A is a cross-sectional view of Applicants' cornea/sclera element of FIG. 2;
FIG. 5A shows Applicants' lenticular bag disposed within the cornea/sclera portion of Applicants' model eye, wherein that lenticular bag comprises a first fluid;
FIG. 5B shows a second fluid disposed within the anterior chamber portion of the apparatus of FIG. 5A;
FIG. 6C is a cross-sectional view of the base portion of FIG. 6B;
FIG. 7B is cross-sectional view of Applicants' model eye showing a second fluid disposed in the posterior chamber portion of the apparatus of FIG. 7A.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
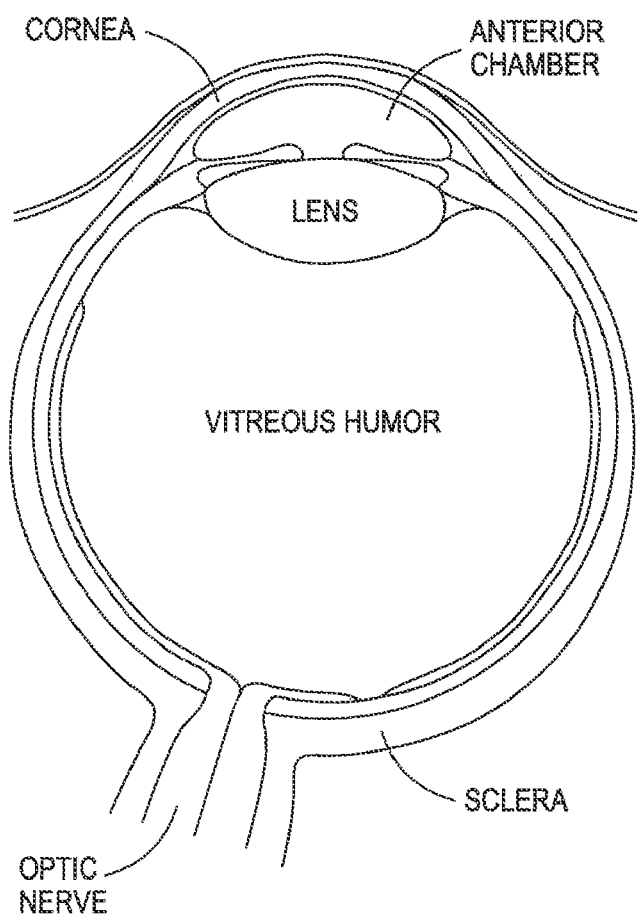
FIG. 1A illustrates a human eye.

Referring now to FIG. 1A, the human eye comprises outer layers which include the cornea and the sclera. These layers enclose an anterior chamber disposed in front of the lens, and a larger posterior chamber disposed behind the lens. The anterior chamber is filled with a watery aqueous humor, and the posterior chamber is filled with a jelly-like vitreous body.

Figure 1B:
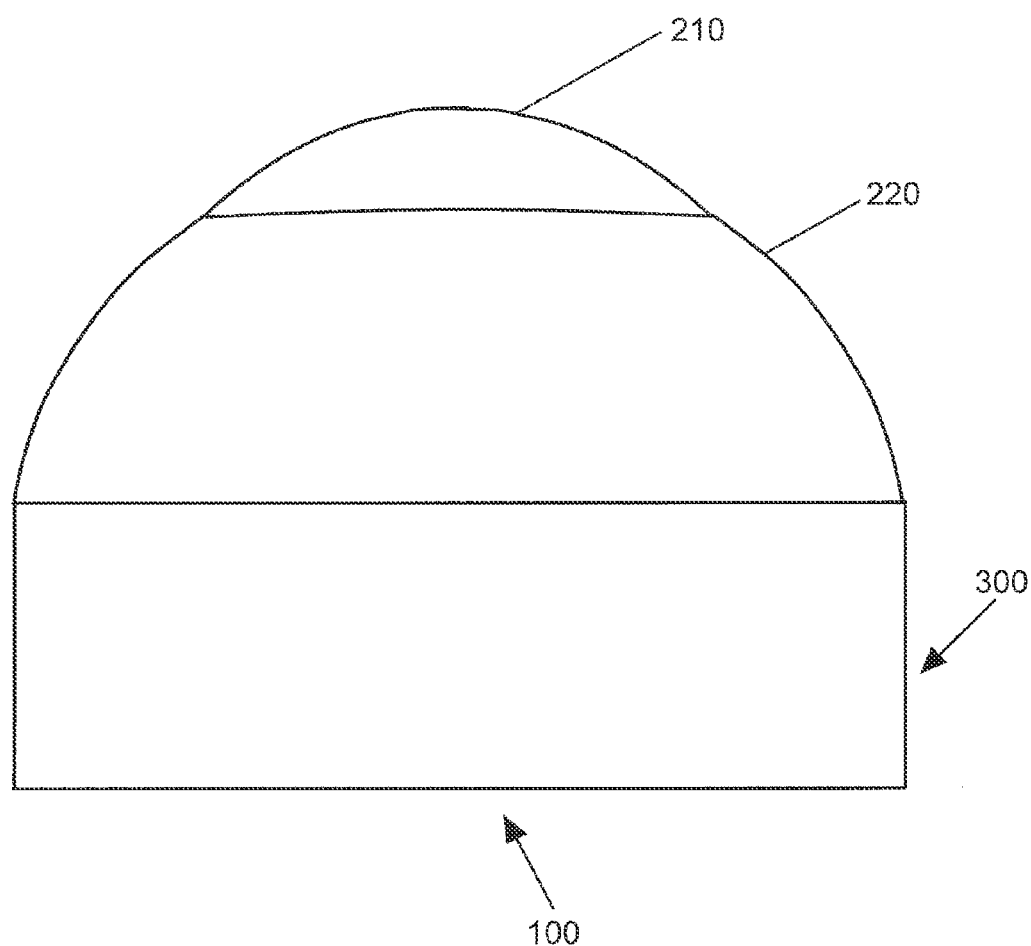
FIG. 1B is a side view of Applicants' model eye.
Figure 2:
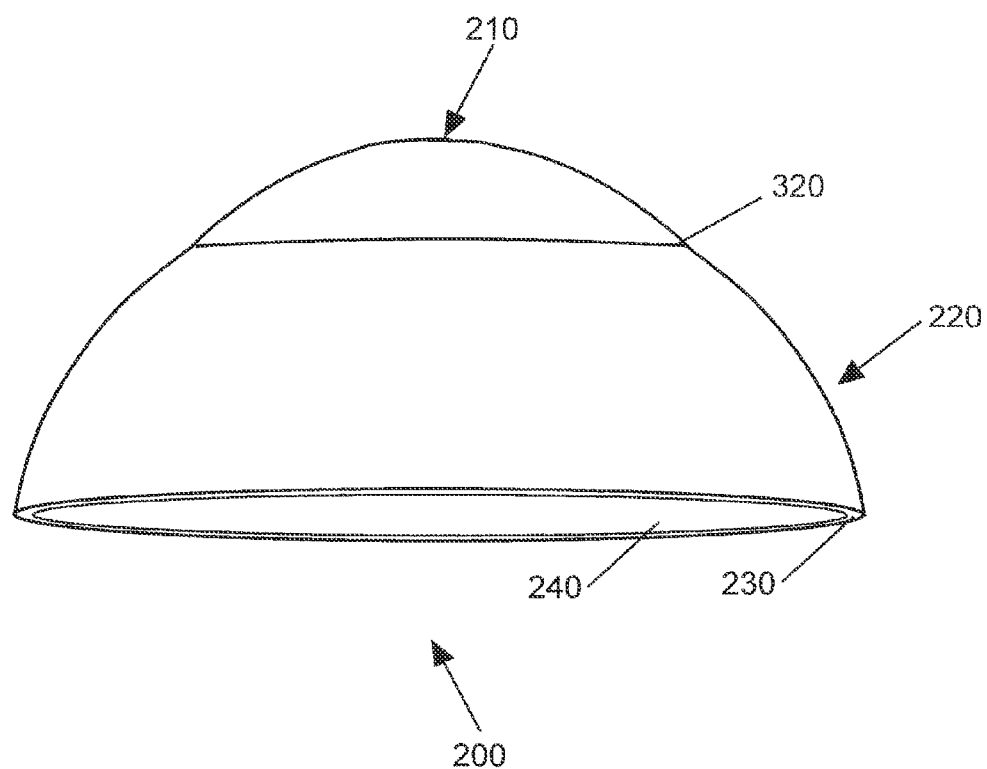
FIG. 2 is a perspective view of the cornea/sclera portion of Applicants' model eye.

Referring now to FIG. 1B, Applicants' artificial eye 100 comprises a cornea portion 210, a sclera portion 220, and a base portion 300. Referring now to FIG. 2, in certain embodiments assembly 200 comprises cornea portion 210 and sclera portion 220. Assembly 200 comprises a extended hemispherical-shaped assembly having an open end 240, wherein that open end 240 is defined by continuous distal end 230.

In certain embodiments, assembly 200 is molded as an integral part. In certain embodiments, assembly 200 is formed by liquid injection molding. In certain embodiments, assembly is formed by injection molding a silicone resin. In certain embodiments, that silicone resin comprises polydimethylsiloxane. In certain embodiments, that silicone resin comprises an elastomeric polydimethylsiloxane.

In certain embodiments, the portion of the mold used to form sclera portion 220 comprises a plurality of microscopic protuberances, i.e. a relatively "rough" surface microscopically. As a result, the molded sclera portion 220 diffracts visible light, and therefore, is visually opaque to the human eye. In contrast, the portion of the mold used to mold cornea portion 210 does not comprise such microscopic roughness. As a result, cornea portion 210 comprises a smooth surface and does not diffract visible light, and is visually transparent to the human eye.

Figure 3B:
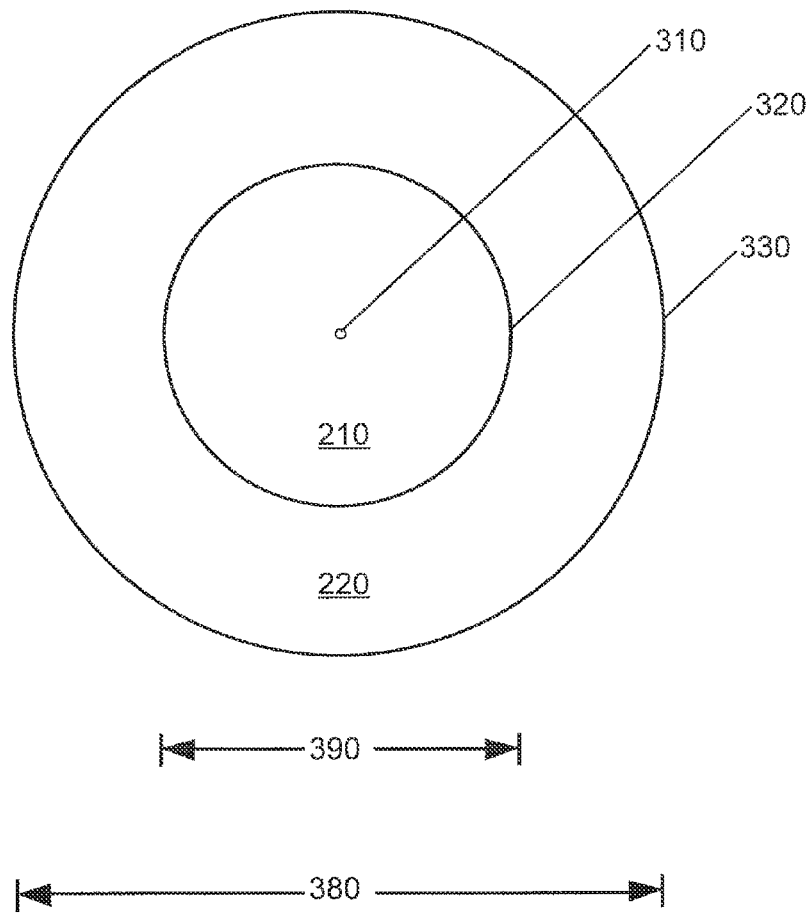
FIG. 3B is a top view of the cornea/sclera portion of Applicants' model eye.

FIG. 3A shows assembly 200 in cross-section. FIG. 3B shows a top view of assembly 200. Referring now to FIGS. 3A and 3B, assembly 200 comprises a height 370 of between about 9 mm and about 10 mm. In certain embodiments, height 370 is 9.5 mm.

Assembly 200 comprises a diameter 380 of between about 22 mm and about 24 mm. In certain embodiments, diameter 380 is 23.22 mm. Cornea portion 210 comprises a diameter 390 of between 11 about mm and about 12 mm. In certain embodiments, diameter 390 is 11.58 mm.

A human cornea comprises a varying thickness, wherein that thickness is greatest at the periphery and decreases to a minimum thickness in the middle. Cornea portion 210 is formed to mimic the varying thickness of the human cornea. Referring now to FIGS. 3A and 3B, cornea portion 210 comprises center point 310. Cornea portion 210 is formed to comprise a minimum thickness 315 at center point 310. In certain embodiments, thickness 315 is between about 0.45 mm and about 0.55 mm. In certain embodiments, thickness 315 is 0.5 mm.

Cornea portion 210 is formed to comprise a maximum thickness 325 along periphery 320. In certain embodiments, thickness 325 is between about 0.6 mm and about 0.8 mm. In certain embodiments, thickness 325 is 0.7 mm. In certain embodiments, the thickness of cornea portion 210 decreases linearly from periphery 320 to center point 310. Cornea portion 210 is formed to include one or more apertures 390, and one or more apertures 395, extending therethrough.

Inner surface 205 of assembly 200 is formed to comprise a first fixturing ridge 340 and a second fixturing ridge 350. Fixturing ridges 340 and 350 are separated by fixturing groove 360. In certain embodiments, fixturing groove 360 comprises an arc having a radius of 0.5 mm.

Figure 4A:
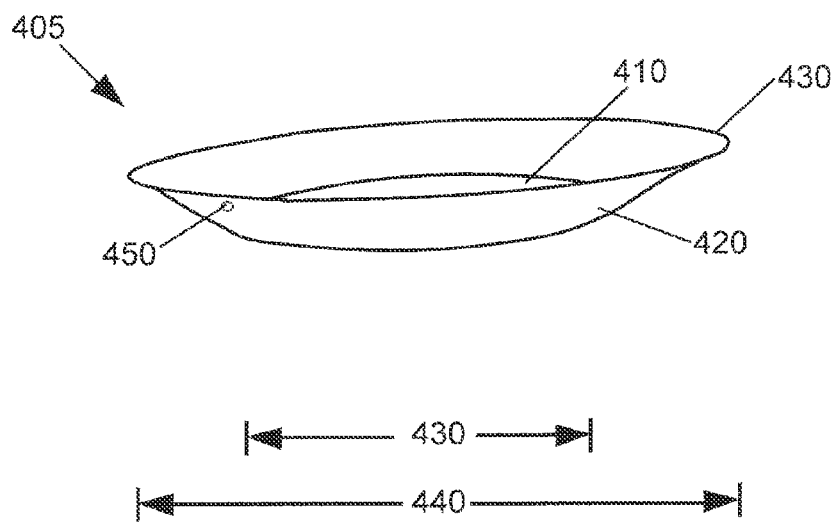
FIG. 4A shows a perspective view of a molding used to form a first embodiment of the lenticular bag portion of Applicants' model eye.

Applicant's artificial eye 100 further comprises a lenticular bag disposed therein. In certain embodiments, Applicants lenticular bag comprises a cylindrical shape with irregular walls. For example and referring now to FIG. 4A, in certain embodiments Applicants form a saucer-shaped assembly 405 comprising a circular base 410 in combination with circular wall 420 which is continuously attached to base 410 and extends outwardly therefrom. Assembly 405 is formed to include at least one aperture 450 extending through wall 420 adjacent distal end 430.

In certain embodiments, assembly 405 is formed from a nitrile rubber. In certain embodiments, assembly 405 is formed from an acrylonitrile butadiene rubber. As those skilled in the art will appreciate, acrylonitrile butadiene rubber, sometimes referred to as "NBR" comprises is a family of unsaturated copolymers of 2-propenenitrile and various butadiene monomers (1,2-butadiene and 1,3-butadiene). The physical and chemical properties vary depending on the loading of acrylonitrile, wherein increased levels of acrylonitrile lower the flexibility of the material. In certain embodiments and as described hereinbelow, assembly 405 is formed from a nitrile rubber having, inter alia, a tear strength approximating that of natural anterior lenticular capsule tissue to permit the teaching and practice of a capsulorhexis procedure used to remove cataracts.

Figure 4B:
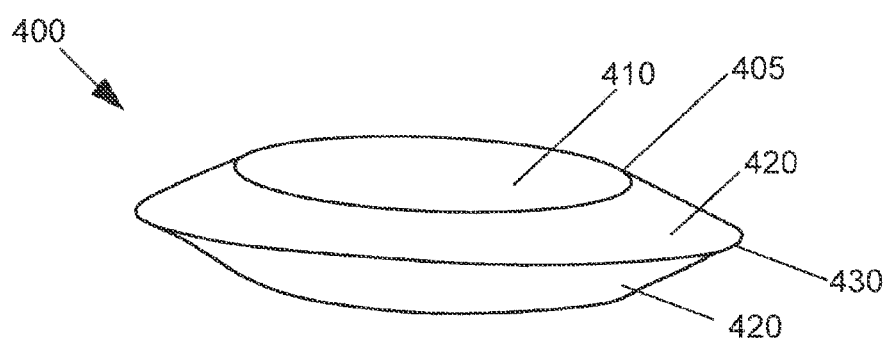
FIG. 4B is a perspective view of a first embodiment of the lenticular bag portion of Applicants' model eye.
Figure 4C:
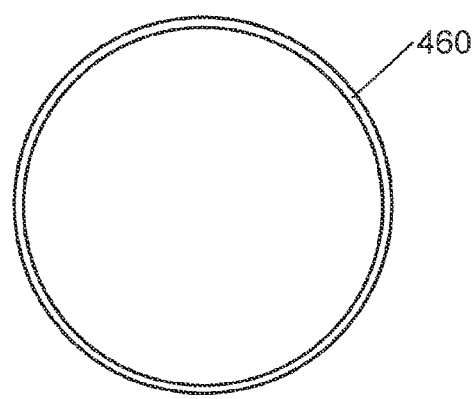
FIG. 4C is a top view of an O-ring used to join the two halves of the first embodiment of Applicants' lenticular bag.
Figure 4D:
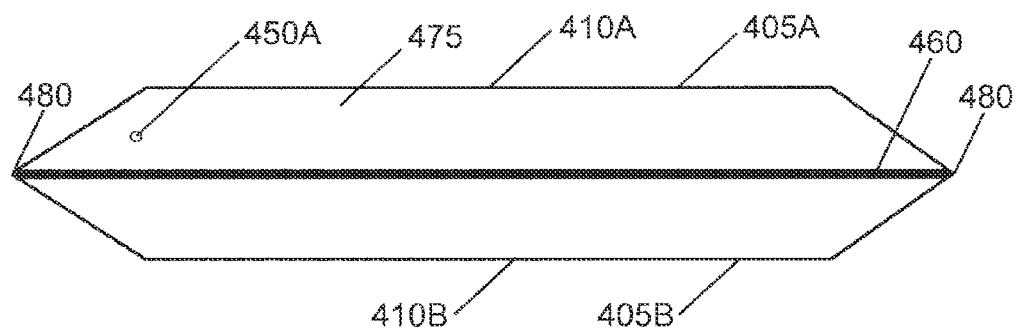
FIG. 4D is a side view of the first embodiment of the lenticular bag portion of Applicants' model eye.

Referring now to FIGS. 4B, 4C, and 4D, Applicants' lenticular bag 400 is formed from two assemblies 405, wherein a first assembly 405A is inverted and adhered to a first side of O-ring 460 (FIGS. 4C, 4D), and wherein second assembly 405B is adhered to the second side of that O-ring, to define enclosed space 475. In certain embodiments, the first assembly 405A, and second assembly 405B, are attached to O-ring 460 using an adhesive. In certain embodiments, that adhesive is selected from the group of products sold in commerce by 3M, wherein that product group consists of VHB Adhesive Transfer Tape F9469PC and VHB Adhesive Transfer Tape F9473PC.

After forming lenticular bag 400 from first assembly 405A and second assembly 405B, Applicants' dispose a fluid 470 into that lenticular bag 400. In certain embodiments, fluid 470 comprises a viscosity between about 1 centipoises and about 10 centipoises. In certain embodiments, fluid 470 comprises a viscosity between about 2 centipoises and about 4 centipoises. In certain embodiments, fluid 470 comprises a viscosity of about 3 centipoises.

In certain embodiments, fluid 470 comprises an aqueous solution comprising gelatin. In certain embodiments, fluid 470 comprises an aqueous solution of one or more water soluble polymers, such as polyvinyl alcohol, polypyrrolidone, poly-2-ethyloxazoline, and combinations thereof.

In certain embodiments, fluid 470 is injected into lenticular bag 400 through one or more of apertures 450. Thereafter, those one or more apertures 450 are sealed thereby encasing fluid 470 within lenticular bag 400. When filled with fluid 470, Applicants' lenticular bag 400 comprises diameter 430 at the top and bottom, and comprises diameter 440 at the wider, middle portion 480.

Figure 8A:
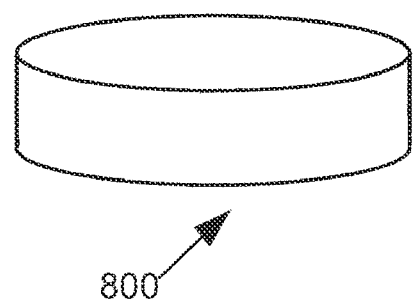
FIG. 8A is a perspective view of a second embodiment of Applicants' lenticular bag.
Figure 8B:
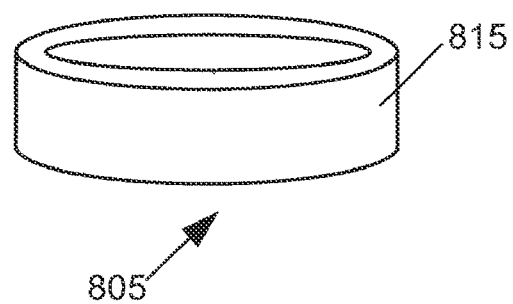
FIG. 8B shows an elastomeric cylindrical assembly used to form the lenticular bag of FIG. 8A.
Figure 8C:
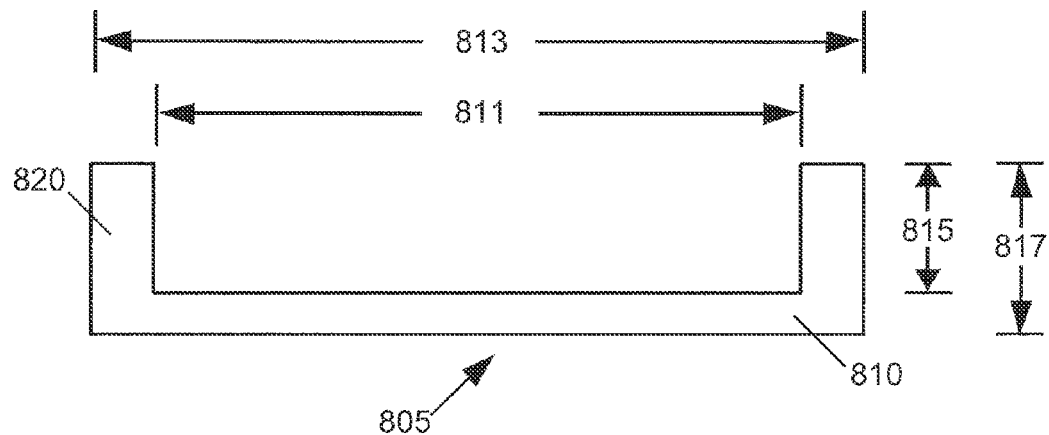
FIG. 8C is a cross-sectional view of the assembly of FIG. 8B.

In certain embodiments, Applicants' lenticular bag comprises a cylindrical shape. For example and referring to FIG. 8A, lenticular bag 800 comprises a cylindrical shape. Referring now to FIGS. 8A, 8B, and 8C, lenticular bag is formed using a molded assembly 805 obtained from Apple Rubber Products, 310 Erie Street, Lancaster, N.Y. 14086-9504. Assembly 805 comprises a cylinder having an open end, and comprises bottom 810 and circular wall 820 attached to, and extending upwardly from, bottom 810. In certain embodiments, assembly 805 is formed from a siloxane elastomer, such as and without limitation polydimethylsiloxane. In certain embodiments, assembly 805 is formed from a nitrile rubber. In certain embodiments, assembly 805 comprises an outer diameter 813 of about 12 mm, an inner diameter 811 of about 11 mm, and a height 817 of 0.5 mm.

Figure 8D:
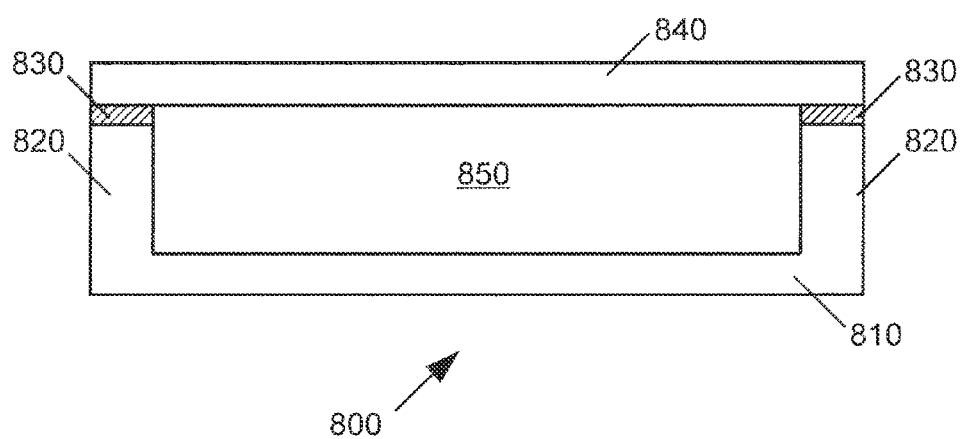
FIG. 8D is a cross-sectional view of the second embodiment of Applicants' lenticular bag.

Referring now to FIG. 8D, cylindrical lenticular bag 800 is formed by attaching top portion 840 to the distal portion of wall 820 using adhesive 830. In certain embodiments, top portion 840 comprises a polyester. In certain embodiments, top portion 840 is formed from polyethyleneterephthalate. In certain embodiments, top portion 840 comprises a thickness of about 0.00050 mils.

In certain embodiments, adhesive 830 comprises a pressure sensitive adhesive. In certain embodiments, that adhesive is selected from the group of products sold in commerce by 3M, wherein that product group consists of VHB Adhesive Transfer Tape F9469PC and VHB Adhesive Transfer Tape F9473PC.

Figure 8E:
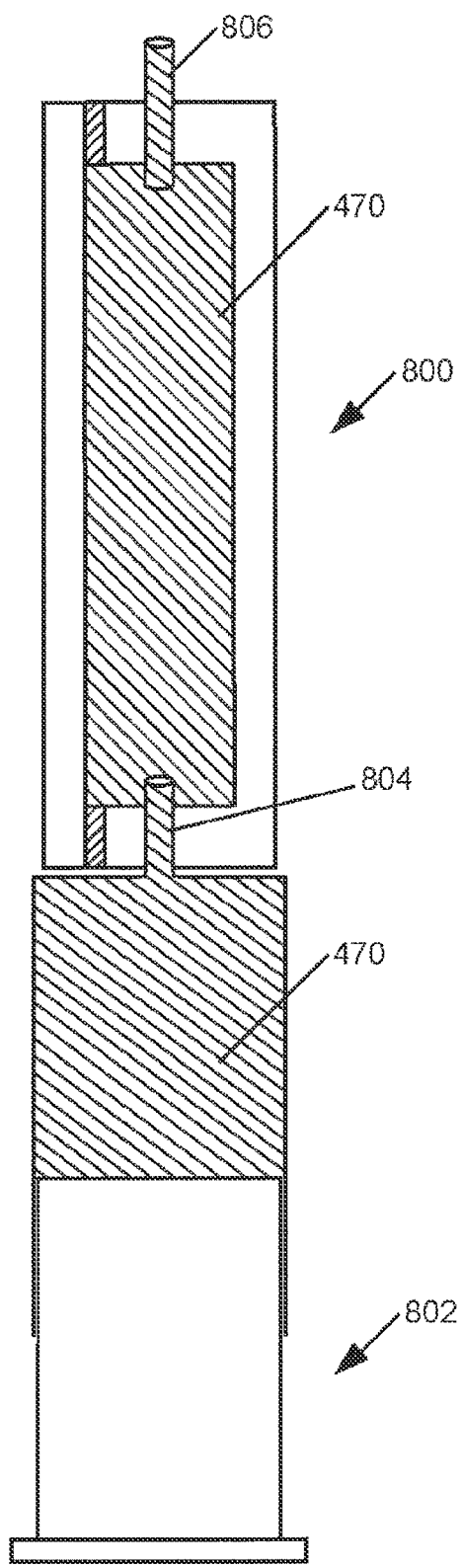
FIG. 8E shows the first fluid being introduced into the lenticular bag of FIG. 8D.
Figure 8F:
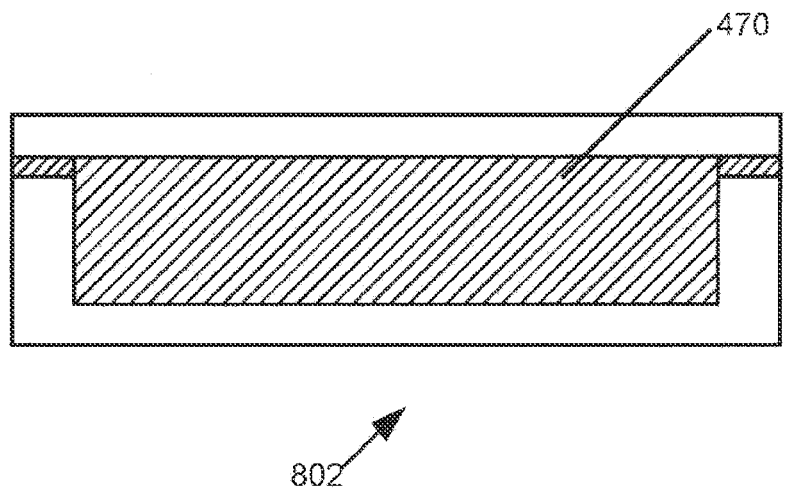
FIG. 8F is a cross-sectional view of the second embodiment of Applicants' lenticular bag comprising the first fluid.

Lenticular bag 800 comprises enclosed space 850. In certain embodiments, enclosed space 850 comprises a volume of about 0.11 milliliters. Referring now to FIGS. 8E and 8F, in certain embodiments enclosed space 850 is filled with fluid 470 using syringe 802 in combination with needle 804. In these embodiments, lenticular bag 800 is disposed vertically, needle 804 is inserted through wall 820 at a first point and into the bottom portion of enclosed space 850, and needle 806 is inserted through wall 820 at a second point and into the top portion of enclosed space 850, wherein a line between the first point and the second point would pass through the center point of bottom 805. Sufficient fluid 470 is injected to fill enclosed space 850. When fluid 470 is released from the needle 806, needle 806 is removed from wall 820, and then needle 804 is removed from wall 820.

In certain embodiments, needles 804 and 806 comprise 28 gauge needles. Referring to FIG. 8F, after removal of needles 804 and 806 from wall 820, the apertures formed in wall 820 from insertion of those needles close to give assembly 802 comprising lenticular bag 800 filled with fluid 470.

Both filled lenticular bags 402 and 802 mimic the capsule surrounding a the lens in the human eye. In a normal human eye, the lens is surrounded by a capsule which separates the lens from the vitreous, which is the thick fluid in the back of the eye, and the aqueous, which is the thinner fluid in the front of the eye. This capsule comprises an anterior portion separating the lens from the aqueous humor, and a posterior portion separating the lens from the vitreous humor.

As those skilled in the art will appreciate, tear strength consists of tear initiation strength (the force required to start a tear), and tear propagation strength (the force needed to continue a tear). Anterior surface 530 (FIGS. 5A, 5B) of filled lenticular bag 402/802 comprises a tear initiation strength that closely approximates the tear initiation strength of the anterior capsule portion of a human eye. In addition, anterior surface 530 of filled lenticular bag 402/802 comprises a tear propagation strength that closely approximates the tear propagation strength of the anterior capsule portion of a human eye.

In the illustrated embodiment of FIG. 5A, filled lenticular bag 402/802 is attached to fixturing groove 360 which is disposed between first fixturing ridge 340 and second fixturing ridge 350. In certain embodiments, lenticular bag 400 is secured in place using an pressure sensitive adhesive. In certain embodiments, that adhesive is selected from the group of products sold in commerce by 3M, wherein that product group consists of VHB Adhesive Transfer Tape F9469PC and VHB Adhesive Transfer Tape F9473PC. The enclosed space between lenticular bag 402/802 and the inner surface 215 of cornea portion 210 comprise anterior chamber 510.

Referring now to FIGS. 5A and 5B, anterior chamber 510 (FIG. 5A) is filled with fluid 520 which comprises a viscosity substantially the same as the aqueous humor found in the anterior chamber of a human eye. By "substantially the same," Applicants mean within about plus or minus ten percent.

In certain embodiments, Applicants' fluid 520 comprises a normal saline solution. In certain embodiments, Applicants' fluid 520 comprises a viscosity of about 1 centipoises. In certain embodiments, Applicants' fluid 520 is injected into anterior chamber 510 through the one or more apertures 390 (FIG. 3A) formed in cornea portion 210. Those one or more apertures 390 are then sealed.

Figure 6A:
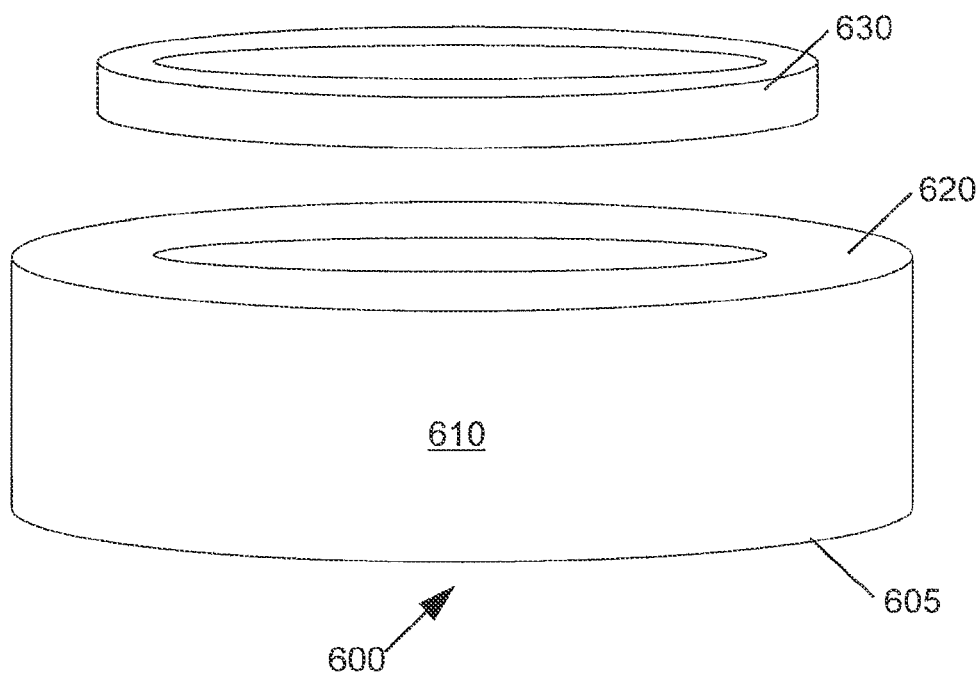
FIG. 6A shows certain of the elements comprising the base portion of Applicants' model eye.
Figure 6B:
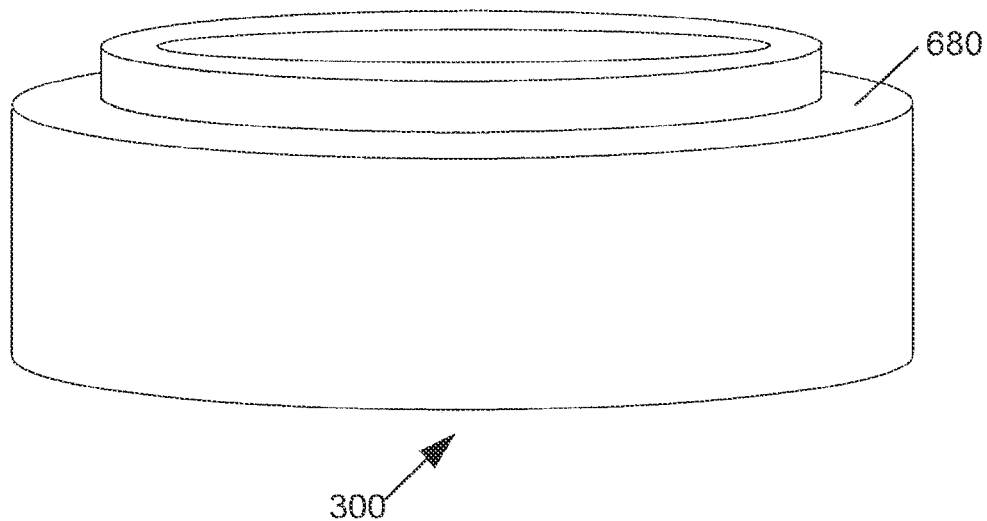
FIG. 6B is a perspective view of the base portion of Applicants' model eye.

FIG. 6B shows a perspective view of base 300. In certain embodiments, base 300 comprises an acrylonitrile butadiene styrene terpolymer. Referring now to FIGS. 6A, 6B, and 6C, base 300 comprises cylindrical portion 600 comprising a circular bottom 605 in combination with circular wall 620 continuously attached to bottom 605 and extending upwardly therefrom to continuous distal end 620. Cylindrical portion 600 comprises outer diameter 670.

In the illustrated embodiment of FIG. 6C, base 300 comprises a bowl-shaped, internal space 640. Annular member 630 is continuously attached to distal end 620, and extends inwardly therefrom to define attachment plateau 680. Annular member 630 comprises an outer diameter 660 and an inner diameter 650.

Annular member 690 is attached to annular member 630 and extends upwardly therefrom. Annular member 690 comprises an outer diameter 660 and an inner diameter 650.

In certain embodiments, diameter 670 is between about 22 mm and about 24 mm. In certain embodiments, diameter 670 is 23 mm. In certain embodiments, diameter 670 is 23 mm. In certain embodiments, diameter 660 is between about 20 mm and about 22 mm. In certain embodiments, diameter 660 is 21 mm. In certain embodiments, diameter 650 is between about 18 mm and about 20 mm. In certain embodiments, diameter 650 is 19 mm.

In certain embodiments, cylindrical portion 600 and annular member 630 comprise an integral assembly. In certain embodiments, that integral assembly is molded from an acrylonitrile butadiene styrene ("ABS") material.

Figure 7A:
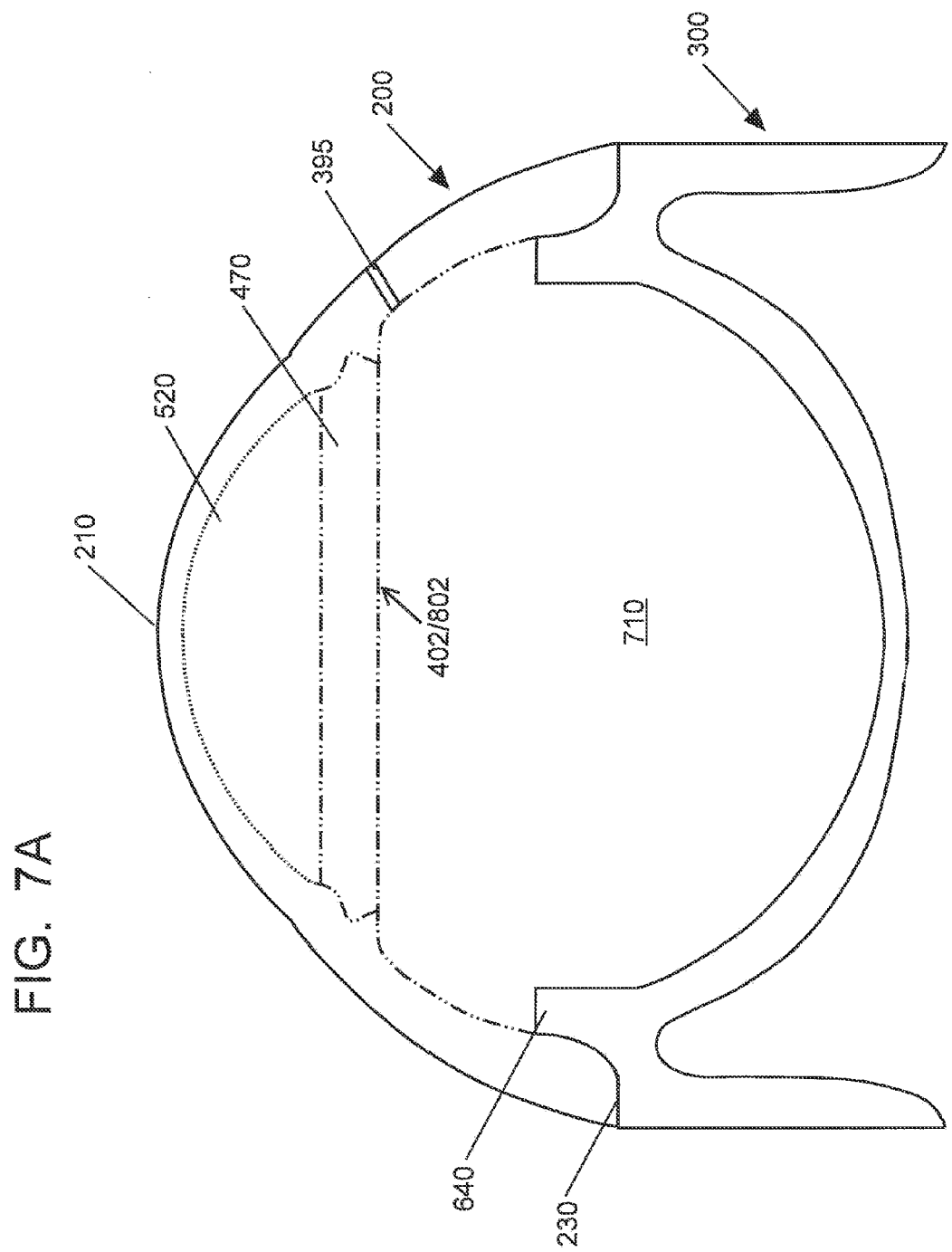
FIG. 7A is cross-sectional view of Applicants' model eye.

FIG. 7A shows subassembly 500 (FIGS. 5A, 5B) in combination with base 300 (FIGS. 1B, 6B, 6C). Distal end 230 (FIGS. 2, 3A, 5A, 7A, 7B) of subassembly 500 is disposed on, and secured by adhesive bonding to, attachment plateau 680 (FIGS. 6B, 6C) of base 300. Subassembly 500 in combination with base 300 define chamber 710. Referring now to FIGS. 7A and 7B, fluid 720 is injected into chamber 710 through the one or more apertures 395, and those one or more apertures are then sealed. The viscosity of fluid 720 is substantially the same as the viscosity of the vitreous humor found in a human eye. In certain embodiments, fluid 720 comprises normal Saline.

Because Applicant's filled globe closely mimics the physical properties of the Cornea, Applicants' model eye can be used to practice suturing the cornea wherein the surgeon must "bury the sutures." Applicants' model eye can be used to practice suturing corneal/scleral lacerations.

In addition, Applicants' model eye 100 can be used to practice an anterior capsulotomy and cataract removal. An anterior capsulotomy is a cataract surgery technique used to make a small round opening in the front of the capsule that contains the eye's natural crystalline lens. Through this opening, the opthalmologist inserts a tiny instrument to break up and remove the cloudy lens. It is then replaced with a plastic prescription lens, i.e. an InterOclularLens or "IOL".

A full corneal transplant, also known as a corneal graft, or as a penetrating keratoplasty, involves the removal of the central portion (called a button) of a diseased cornea and replacing it with a matched donor button of cornea. Corneal grafts are performed on patients with damaged or scarred corneas that prevent acceptable vision. This may be due to corneal scarring from disease or trauma.

Two model eyes can be used to practice corneal grafts. A first model eye 100 is used as the "donor." A corneal button is obtained from this first model eye. That corneal button is then sutured in place on a second model eye 100.

Applicants' model eye 100 may be used to practice Phacoemulsification. To practice the Phacoemulsification procedure, a very small incision (3.2 mm) is made into cornea portion 210, and the gelatinous material 470 is converted in to a soft pulp using high frequency sound waves. That pulp-material is then sucked out. Subsequently, a foldable lens IOL is injected through the small incision and positioned into the lenticular bag 400/800.

While the preferred embodiments of the present invention have been illustrated in detail, it should be apparent that modifications and adaptations to those embodiments may occur to one skilled in the art without departing from the scope of the present invention as set forth in the following claims.

We claim:

1. A model human eye, comprising:
    an extended hemispherical-shaped, integrally molded assembly comprising a visually transparent cornea portion surrounding a visually opaque sclera portion, a center point, and an open end defined by a first continuous distal end, wherein:
        the cornea portion is symmetrically disposed around said center point and extends to a peripheral edge;
        the sclera portion is disposed between said cornea portion and said first continuous distal end;
        said cornea portion is formed to comprise a minimum thickness at said center point between about 0.45 mm and about 0.55 mm;
        said cornea portion is formed to comprise a maximum thickness at said peripheral edge of between about 0.6 mm and about 0.8 mm; and
        said globe portion is visually opaque;
    a lenticular bag disposed within said first molded assembly; and
    a base comprising a bottom and one or more walls attached to said bottom and extending outwardly therefrom, wherein said one or more walls comprise a second continuous distal end;
    wherein;
        said first continuous distal end is attached to said second continuous distal end to define a first enclosed space;
        said lenticular bag separates said first enclosed space into an anterior chamber and a posterior chamber; and
        said model human eye is structurally suited for practicing a surgical technique selected from the group consisting of:
            repair of a corneal laceration;
            repair of a scleral laceration;
            corneal suturing;
            capsulorhexis;
            phaco-emulsification;
            intraocular lens implant; and
            penetrating keratoplasy.

2. The model human eye of claim 1, further comprising an annular member continuously attached to said second continuous distal end, and extending outwardly therefrom.

3. The model human eye of claim 1, wherein:
    said extended hemispherical-shaped assembly comprises a siloxane elastomer; and
    said base comprises an acrylonitrile butadiene styrene terpolymer.

4. The model human eye of claim 1, further comprising:
    a first fluid disposed in said lenticular bag; and
    a second fluid disposed in said anterior chamber and in said posterior chamber.

5. The model human eye of claim 4, wherein:
    said first fluid comprises gelatin; and
    said second fluid comprises normal Saline.

6. The model human eye of claim 1, wherein said lenticular bag comprises:
    a cylindrical portion formed to include an open end and comprising a circular bottom comprising a diameter, and a circular wall continuously attached to said circular bottom and extending outwardly therefrom; and
    a circular planar member comprising said diameter;
    wherein said circular planar member is continuously attached to circular wall to form a second enclosed space.

7. The model human eye of claim 6, wherein said cylindrical portion is formed from an elastomeric siloxane.

8. The model human eye of claim 7, wherein said circular planar member comprises polyethyleneterephthalate.

9. The model human eye of claim 8, wherein said circular planar member comprises a thickness of 0.0005 mils.

* * * * *